US005610359A

United States Patent [19]

Spector et al.

[11] Patent Number: 5,610,359

[45] Date of Patent: Mar. 11, 1997

[54] METHOD OF GENERATING NON-TOXIC SMOKE

[76] Inventors: Yechiel Spector, 5 Avner; Esther Jacobson, 16 Shmariahu Levin, both of Tel Aviv; Vida Naishtut, 7/17 Iftah Hagiladi, Kiriat Gat; Michael Vittenberg, 10 Yochanan H'Aroni; Zohar Beinert, 6/31 Rahavat Hashila, both of Beersheva, all of Israel

[21] Appl. No.: 328,981

[22] Filed: Oct. 25, 1994

Related U.S. Application Data

[62] Division of Ser. No. 120,497, Sep. 14, 1993, abandoned.

[30] Foreign Application Priority Data

Feb. 16, 1993 [IL] Israel ........................................ 104758
Jul. 18, 1993 [IL] Israel ........................................ 106382

[51] Int. Cl.[6] ............................ F42B 12/48; B64D 1/04; A45C 1/02; C09K 3/30

[52] U.S. Cl. ............................... 89/1.11; 252/305; 252/4; 252/6; 169/46; 169/28; 149/117; 149/19.6; 102/334

[58] Field of Search .................................. 252/305, 4, 6; 169/42, 26, 66, 68, 27, 28, 91; 149/19.6, 117; 102/334; 89/1.11

[56] References Cited

U.S. PATENT DOCUMENTS

| | | | |
|---|---|---|---|
| 82,582 | 9/1868 | Babcock | 252/2 |
| 191,306 | 5/1877 | Budy | 252/5 |
| 278,315 | 5/1883 | Crickelair | 252/5 |
| 1,118,952 | 12/1914 | Scheuffgen | 169/66 |
| 1,807,456 | 5/1931 | Wedger et al. | 252/5 |
| 2,074,938 | 3/1937 | Read | 252/5 |
| 2,778,927 | 9/1955 | Dill et al. | 169/44 |
| 3,369,609 | 2/1968 | Fogelgren | 169/36 |
| 3,467,558 | 9/1969 | Wernette et al. | 149/19.6 |
| 3,654,996 | 4/1972 | Naglowsky | 169/2 |
| 3,773,111 | 11/1973 | Dunn | 169/26 |
| 3,843,525 | 10/1974 | Hattori et al. | 252/5 |
| 3,972,820 | 8/1976 | Filter | 252/5 |
| 3,980,139 | 9/1976 | Kirk | 169/36 |
| 4,366,010 | 12/1982 | Sédat | 149/19.6 |
| 4,455,178 | 6/1984 | Sédat | 149/19.6 |
| 4,697,521 | 10/1987 | Espagnacq et al. | 102/334 |
| 4,961,865 | 10/1990 | Pennartz | 169/46 |
| 4,968,365 | 11/1990 | Krone | 102/334 |
| 5,082,575 | 1/1992 | Yamaguchi | 169/44 |
| 5,337,671 | 8/1994 | Varmo | 102/334 |
| 5,423,385 | 6/1995 | Barntov et al. | 169/46 |
| 5,425,426 | 6/1995 | Baratov et al. | 169/46 |

FOREIGN PATENT DOCUMENTS

| | | | |
|---|---|---|---|
| 7445739 | 12/1988 | U.S.S.R. | 252/5 |
| 2028127 | 3/1990 | United Kingdom . | |

*Primary Examiner*—Sharon Gibson
*Assistant Examiner*—Joseph D. Anthony

[57] ABSTRACT

A method of generating nontoxic smoke is taught. The method comprises: (a) submerging a nontoxic smoke creating device in a liquid coolant while preventing entry of coolant into said device; said device includes a composition which comprises: (1) a first reactant selected from the group consisting of potassium chlorate, potassium perchlorate, potassium dichromate, cesium nitrate, and potassium nitrate; and (2) a second reactant serving as a reduction agent; (b) activating said smoke creating device by reacting said composition comprising said first reactant and said second reactant, to create solid particulate products having a diameter of about one micron or less which create the nontoxic smoke; and (c) passing said solid particulate products into said coolant through at least one downwardly directed tuyere hydraulically connected at or near the top of said device without any accompanied destruction of said nontoxic smoke creating device.

1 Claim, 9 Drawing Sheets

METHOD OF GENERATING NON-TOXIC SMOKE

This is a divisional application of U.S. patent application Ser. No. 08/120,497, filed Sep. 14, 1993, now abandoned.

FIELD AND BACKGROUND OF THE INVENTION

The present invention relates to fire extinguishing and smoke producing methods and associated systems and, more particularly, to methods and related systems which do not involve halocarbons and which are highly effective in extinguishing fires and/or in setting up smoke screens, even when relatively small quantities of chemicals are used yet are nontoxic.

The present invention relates, in particular, to methods and systems for volume fire extinguishing, some of which methods can also be used to create an effective and nontoxic smoke screen. Throughout most of the subsequent discussion, reference will be made largely to fire extinguishing applications of methods and systems according to the present invention, with only brief mention of use of such methods and systems in the creation of smoke. It is intended that both applications, as well as others, fall within the scope of the present invention.

Volume fire extinguishing involves the temporary creation of an atmosphere which is incapable of sustaining combustion within the volume to be protected, typically a relatively confined volume, or by applying a stream of extinguishing agent to the base of the flame which is known as local application and is commonly practiced using portable fire extinguishers.

One of the volume fire extinguishing methods in most widespread use at present includes the introduction of volatile halocarbons, such as Halon 1301, for example, into the volume to be protected. One of the extinguishing agents which are presently commonly used for location applications is Halon 1211. Halocarbons have excellent fire extinguishing capacity which is attributable to their being inhibitors of combustion. Halocarbons actively interfere with the chemical reactions taking place in the flame and effectively inhibit them.

Furthermore, halocarbons have a number of desirable properties such as low toxicity. In addition, halocarbons gases can be rather easily liquefied under pressure, making them easily storable in the liquefied state. Halocarbons do not adversely affect equipment and other materials with which they come in contact.

Nevertheless, halocarbons suffer from a fundamental disadvantage, namely, they are known to interact with ozone, which leads to the destruction of the earth's ozone layer. According to the 1987 Montreal Protocol, which prescribed a number of international measures for the protection of the earth's ozone layer, the use of halocarbons is to be completely banned by the year 2000.

Another commonly used total flooding and local application extinguishing agent is $CO_2$. Because of its high weight-to-extinguishing-power ratio and other health considerations, the use of carbon dioxide has been drastically reduced as halons have gained wider acceptance.

It is thus quite urgent to find alternative volume fire extinguishing means which could successfully act as a replacement for halocarbons or to enhance the performance of other commonly used extinguishing agents, such as $CO_2$, and the like. A successful replacement for halocarbons would possess a volume and local fire extinguishing effectiveness at least equal to that of halocarbons, yet would be ecologically safe and nontoxic.

Two basic types of such ecologically benign fire extinguishing materials are presently known. The first includes inert gaseous diluents, such as carbon dioxide, nitrogen, water vapor, and the like. The second type includes fire extinguishing powders based on mineral salts, such as carbonates, bicarbonates, alkali metal chlorides, ammonium phosphates, and the like.

As presently implemented, both types of materials suffer from serious disadvantages. Inert gaseous diluents are largely ineffective in disrupting the reactions taking place in the flame. Rather, inert diluents act by diluting the air in the volume being protected, thereby lowering the oxygen concentration below that required to sustain the combustion. An example of the use of inert diluents is disclosed in U.S. Pat. No. 4,601,344 to Reed. Reed relates to a gas generating composition containing glycidyl azide polymer and a high nitrogen content additive which generates large quantities of nitrogen gas upon burning and can be used to extinguish fires.

For relatively airtight volumes, the amount of diluent required roughly equals the amount of air already in the volume prior to combustion. If the volume to be protected is not airtight, the required volume of the inert diluent must be several times that of the protected volume.

Fire extinguishing methods based on inert dilution require relatively large amounts of diluent and are appreciably less effective and reliable than extinguishing with halocarbons.

Volume fire extinguishing with the help of powders is carried out by dispensing a powder aerosol in the volume to be protected. The aerosol envelops the flame thereby suppressing it. It is believed that powders chemically interrupt combustion by forcing the recombination and deactivation of chain propagators responsible for sustaining the combustion process in the focus of fire.

Such recombination is believed to occur both at the surface of the solid particles of the aerosol and, to some extent, also in reactions of the chain propagators with gaseous products of the evaporation and decomposition of powders in the flame. Chain propagators are gaseous atomic particles or radicals having a free valence, which serve to initiate and sustain the branched chain reactions characteristic of combustion processes in combustible substances containing carbon.

However, the efficiency of presently implemented volume fire extinguishing with the help of powders is also of limited efficacy because of the comparatively low dispersity of the fire-extinguishing powders. The particle size of presently used powders ranges from about 20 to about 60 microns. Such large particles have a relatively low surface-to-volume ratio. Since the desired reactions take place largely on the surface of the particles, a given amount of such powders has a limited capacity for interrupting the chain reactions and putting out the fire.

Further, it is difficult to prepare an aerosol of such powders which will distribute uniformly throughout the volume to be protected. It is, in addition, difficult to ensure that the powder particles, once formed, will stay in their original suspended state while stored for a sufficiently long period prior to use so as to maintain the viability of the product as a fire extinguishing composition. Finely-dispersed powders have a strong tendency to agglomerate, or cake, during storage. Such agglomeration greatly hinders the dispensing of the material from its storage container during use. Furthermore, whatever particles are able to leave the storage container and come in contact with the fire are relatively coarse-grained powder particles, having a relatively low surface-area-to-volume ratio and thus possessing reduced fire extinguishing capacity per unit weight.

Attempts have been made to solve the problems associated with the long-term storage of finely divided powders. Exemplary of such attempts is U.S. Pat. No. 4,234,432 to Tarpley, which discloses a powder dissemination composition in which the powder is contained in a thixotropic gel which prevents the agglomeration, sintering, and packing of the powder material. The finely divided powder has at least a bimodal particle distribution size distribution encapsulated in a gelled liquid. The method appears to be complex, requiring the fabrication of a powder of a well-defined particle size distribution.

In at least one case, attempts have been made to get around the storage problems by storing reaction precursors rather than the actual powders. U.S. Statutory Invention Registration No. H349 to Krevitz et al. discloses reagent compositions which are chemically inert when solid and are chemically active when molten. The reagent compositions may comprise a first substance such as a high molecular weight wax or polymer and a second substance which is dissolved, dispersed, or encapsulated in a solid matrix of the first substance. The second substance is a highly chemically reactive compound such as a strong base or a strong acid. As solids, the reagent compositions are inert. When molten, the second substance is exposed and the resultant liquid solutions are highly reactive.

There is thus a widely recognized need for fire extinguishing methods and systems which are at least as effective as those involving the use of halocarbons but which are ecologically safe.

Specifically, there is a clear need for, and it would be highly advantageous and desirable to have, fire extinguishing methods and systems which use chemicals which do not adversely affect the earth's ozone layer and which are capable of putting out fires quickly and efficiently.

In addition, there is a widely recognized need for smoke creating methods and systems which are highly effective yet are not toxic.

SUMMARY OF THE INVENTION

According to the present invention there is provided a method of generating nontoxic smoke, comprising: prepositioning a smoke creating device, the device including a composition which includes: (1) a first reactant selected from the group consisting of potassium chlorate, potassium perchlorate, potassium dichromate, cesium nitrate, and potassium nitrate; and (2) a second reactant serving as a reduction agent; wherein the medium is activated so as to cause the first reactant and the second reactant to react with each other to create products such that the products create the smoke.

Also according to the present invention there is provided a system for generating nontoxic smoke, comprising: a smoke creating device, the device including a composition which includes: (1) a first reactant selected from the group consisting of potassium chlorate, potassium perchlorate, potassium dichromate, cesium nitrate, and potassium nitrate; and (2) a second reactant serving as a reduction agent; wherein the medium is activated so as to cause the first reactant and the second reactant to react with each other to create products such that the products create the smoke.

Also according to the present invention there is provided a system for extinguishing a fire or generating nontoxic smoke, comprising: a device including a composition which includes: (1) a first reactant selected from the group consisting of potassium chlorate, potassium perchlorate, potassium dichromate, cesium nitrate, and potassium nitrate; and (2) a second reactant serving as a reduction agent; wherein the medium is activated so as to cause the first reactant and the second reactant to react with each other to create products effective in extinguishing fire or generating smoke and wherein the system is designed to be placed at a remote location following activation.

Further according to the present invention there is provided a system for extinguishing a fire, comprising: (a) a conventional fire extinguishing cylinder for releasing a pressurized fire extinguishing gas; and (b) a device including a composition which includes: (1) a first reactant selected from the group consisting of potassium chlorate, potassium perchlorate, potassium dichromate, cesium nitrate, and potassium nitrate; and (2) a second reactant serving as a reduction agent; wherein the medium is activated so as to cause the first reactant and the second reactant to react with each other to create products effective in extinguishing fire, the device being located so that the fire extinguishing gas and the products intermix.

Yet further according to the present invention there is provided a fire extinguishing apparatus, comprising: (a) an inert gas fire extinguishing apparatus for releasing a pressurized fire extinguishing gas, the apparatus including a discharge nozzle; and (b) a device including a composition which includes: (1) a first reactant selected from the group consisting of potassium chlorate, potassium perchlorate, potassium dichromate, cesium nitrate, and potassium nitrate; and (2) a second reactant setwing as a reduction agent; wherein the medium is activated so as to cause the first reactant and the second reactant to react with each other to create products effective in extinguishing fire, the device being located so that the fire extinguishing gas and the products intermix, the device being located in or around the discharge nozzle, the inert gas fire extinguishing apparatus and the device being activated so as to allow the inert gas and the products to intermix.

According to further embodiments of systems according to the present invention the system is in the form of a hand grenade or a launchable grenade.

The present invention successfully addresses the shortcomings of the presently known configurations by providing ecologically benign methods and associated systems for putting out fires which is highly effective and which requires relatively small amounts of chemicals per unit volume protected.

The methods according to the present invention are advantageous in that they facilitate the rapid and reliable liquidation of the focus of fire anywhere in the protected volume. The methods can easily be automated, so as to be activated automatically upon the sensing, for example, of a certain preset elevated temperature in the volume, or other parameters which may indicate the presence of a fire, such as radiation, gaseous products, change in pressure, and the like. In addition, systems according to the present invention, for use in either fire extinguishing and smoke creating applications, may feature the ability of being projected onto a fire from a distance, as by throwing a device which resembles a hand grenade or by shooting a device using a suitable launcher.

The compositions involved in methods according to the present invention act to extinguish the target in at least two basic ways. One way, which is common to presently known powder fire extinguishes, involves the absorption of heat by, and consequent heating of, the solid particles, amplified by the evaporation of various chemical species. A second, and much more significant, way of extinguishing the fire is through the chemical interaction of various species present during the activation of a composition according to the present invention with the flame chain reactions, effecting the interruption of these chain reactions.

The present invention is suitable in the fire protection of various volumes, including, but not limited to, various compartments, machine rooms, cable tunnels, cellars, chemical shops, painting chambers, reservoirs, storage vessels for oil products and liquefied gases, pump rooms handling combustible substances, and the like, as well as diverse means of transportation, such as motor vehicles, aircraft, ships, locomotives, armored vehicles, naval vessels, and the like. The present invention is further useful in creating an effective yet nontoxic smoke screen.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
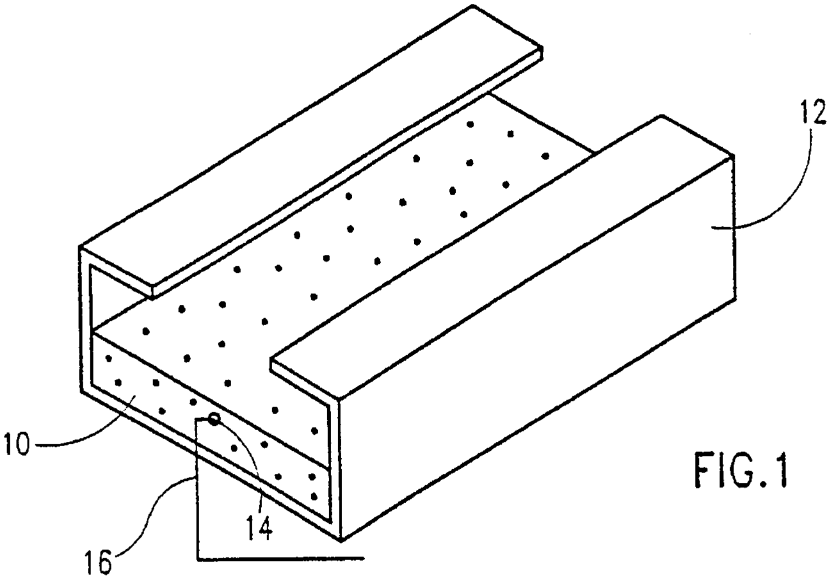
FIG. 1 is a configuration according to the present invention showing solid fuel composition ("SFC") material in solid or powder form placed in a profile.

The present invention is of methods and associated systems which can be used to effectively extinguish fires or create smoke screens and which are not harmful to the ozone layer.

Specifically, the present invention relates to various means of storing two or more reactants which can be activated, directly or indirectly, and made to react upon the incidence of fire, forming products which, with or without the benefit of pre-cooling, tend to interfere with the propagation of the fire thus serving to put out the fire; or to create dense smoke which has a variety of civilian and military applications.

Novel configurations for effecting methods for volume fire extinguishing and smoke creating are disclosed herein. A key feature of each of configurations according to the present invention is the in-situ formation of a very finely dispersed aerosol. The aerosol is not prepared ahead of time and stored, as in presently known systems. Rather, the aerosol is created or produced in situ when needed, as, in the case of fire extinguishing, during the fire accident, by combusting a solid-fuel composition or medium (hereinafter referred to as "SFC"), which includes at least two reactants capable of reacting with one another.

Preferably, one of the reactants is an oxidant while the other is a reducing agent. More preferably, the SFC further includes a filler, such as potassium chloride or ammonium phosphate. Upon reaction, the SFC forms gaseous products and solid aerosol particles in the combustion products. The gaseous products, and especially the solid aerosol particles, exert a strong inhibiting effect on the flame of the fire which is to be extinguished by promoting the recombination of combustion propagation centers, thereby inhibiting the continuation of the fire and extinguishing it.

In contrast with currently known powder volume fire extinguishing technologies, the systems according to the present invention obviate the need for storing an aerosol, usually stored as a powder, and a separate pressurized propellant, such as air. As was described above, such storage leads to the gradual agglomeration of the particles, leading to dispensing difficulties and to reduced effectiveness brought about by the reduction of the particle surface areas.

The fire extinguishing capacity of an aerosol created in systems according to the present invention is greatly increased in comparison with known technologies since an aerosol according to the present invention is made up of particles of a much smaller size, typically on the order of one micron, and hence much larger surface to volume ratio, than has been heretofore known. The smaller particle size makes for a more highly dispersed and more highly effective aerosol.

As the particle size decreases, the extinguishing surface of the aerosol, on which heterogeneous recombination of the chain propagators takes place, increases. All other things being equal, the number of the aerosol particles per unit volume increases in inverse proportion to the cube of the diameter of the particles, whereas the surface area of the particles is directly proportional to the square of the diameter. Consequently, the total surface of the particles increases in inverse proportion to the square of the diameter of the particles or in direct proportion to the dispersity of the aerosol.

Moreover, as the size of the particles diminishes, the rate of sublimation increases, and the extinguishing effect is augmented by homogeneous gas phase inhibition of the fire flame through the agency of gaseous products forming from the condensed part of the aerosol.

The ability of the aerosol to effect the recombination of the chain propagators depends to some extent on the chemical composition of the solid particles. It has been determined that the best fire propagation inhibiting properties are displayed by carbonates, bicarbonates, chlorides, sulfates, and oxides of metals such as, but not limited to, those belonging to Group IA of the Periodic Table, with the exception of Li and Fr. This is discussed, for example, in A. N. Baratov and L. P. Vogman, "Fire Extinguishing Powder Compositions", Moscow, Strojizdat Publishers, 1962, which article is incorporated herein in its entirety by reference as if fully set forth herein.

It has been further determined that the strongest inhibitors are strontium sulfates and cesium sulfates, with potassium chlorides and sodium chlorides being not quite as effective, and with potassium bicarbonates and sodium bicarbonates being somewhat less effective.

Taking into account the availability and cost, as well as the performance characteristics, of these various inhibitors, it would appear that alkali metal chlorides may be commercially most suitable for use in fire extinguishing powders and aerosols.

According to the present invention these powders are created in situ in a finely dispersed form through the reactions of the SFC and are applied to the fire, or used to create a smoke screen immediately following their creation. The SFC is combusted to produce the desired aerosol containing the compounds described above. Prior to combustion, the SFC includes at least two reactants which are capable of reacting with each other to form desired products.

Preferably, the SFC includes one reactant which is preferably an oxidant, such as potassium perchlorate, potassium dichromate, potassium nitrate, potassium chlorate, cesium nitrate, or the like. The SFC further includes a second reactant preferably capable of acting as a reducing agent which may be one or more of various organic materials, such as rubber, polymeric materials, epoxy resin, phenol formaldehyde resin, and the like, or which may be phosphorus, sulfur, and the like. The SFC may also include a filler such as, but not limited to, potassium chloride. The filler serves the function of regulating the temperature of the aerosol by absorbing some of the heat of the oxidation-reduction reactions. Simultaneously, the filler serves as a source of potassium compounds which are used in extinguishing the fire.

It should be borne in mind that for extinguishing smoldering materials (fire accidents of Class A), it is necessary not only to liquidate flame burning in the gaseous phase but also to isolate the surface of burning material from air. This can be accomplished, for example, with the further inclusion in the SFC of ammonium phosphates, which are known fire extinguishing compounds.

The precise composition and concentration of the SFC used in systems according to the present invention is selected with an eye toward the type of fire likely to be encountered and the cost, availability, and ease of use of the various suitable components. The possible combinations of components making up the SFC and their precise concentrations are virtually limitless. What is critical to methods and systems according to the present invention is not the precise composition but the in situ reaction, preferably an oxidation-reduction reaction, of two or more components of the SFC to form an aerosol having very fine solid particles.

As illustrations of typical SFC compositions, and without in any way limiting the scope of the present invention, eleven possible compositions are described below.

| | |
|---|---|
| Composition 1: | |
| Potassium perchlorate | 40–50 wt % |
| Epoxy resin 7D-20 (with hardener) | 9–12 wt % |
| Potassium chloride | 40–44 wt % |
| Magnesium powder | 0–4 wt % |
| Composition 2: | |
| Potassium dichromate | 20 wt % |
| Gunpowder grade "H" | 80 wt % |
| Composition 3: | |
| Mg | 25 wt % |
| $CsNO_3$ | 75 wt % |
| Composition 4: | |
| Mg | 25 wt % |
| $KNO_3$ | 75 wt % |
| Composition 5: | |
| Iditol (phenol-formaldehyde resin) | 30 wt % |
| $KNO_3$ | 70 wt % |
| Composition 6: | |
| Potassium chlorate | 65–70 wt % |
| Potassium chloride | 16–20 wt % |
| Epoxy resin | 12–18 wt % |
| Composition 7: | |
| Potassium chlorate | 37–45 wt % |
| Potassium nitrate | 37–45 wt % |
| Epoxy resin | 16–19 wt % |
| Mg (or Al) | 1–3 wt % |
| Composition 8: | |
| Potassium perchlorate | 37–45 wt % |
| Potassium nitrate | 37–45 wt % |
| Epoxy resin | 16–19 wt % |
| Mg (or Al) | 1–3 wt % |
| Composition 9: | |
| Potassium nitrate | 70–80 wt % |
| Epoxy resin | 19–23 wt % |
| Mg (or Al) | 2–4 wt % |
| Composition 10: | |
| Cesium nitrate | 80–90 wt % |

-continued

| | |
|---|---|
| Epoxy resin | 10–20 wt % |
| Composition 11: | |
| $KNO_3$ | 70–80 wt % |
| Epoxy | 20–25% |
| Mg | 0–2 wt % |

When selecting solid-fuel composition components, one should also ensure that both the initial composition of the SFC and its combustion products are nontoxic and stable. The stable compositions listed above were tested and were found to be characterized in that their combustion, while rapid, is incapable of becoming so rapid as to be become explosive. For illustrative purposes, it is believed that use of a combination of potassium perchlorate as the oxidant, epoxy EPON 828 as a reducing agent, magnesium for enhancing the temperature and the rate of burning, and potassium chloride as filler provides an SFC which, upon combustion, produces an aerosol having a high inhibiting effectiveness, is harmless, and is stable.

Without in any way limiting the scope of the present invention, it may be instructive to briefly discuss the mechanisms believed to be responsible for the efficacy of methods and systems according to the present invention. For illustrative purposes discussion is limited to a system including potassium chlorate, an epoxy resin and potassium chloride.

Upon combustion of an SFC made up of potassium chlorate (68 wt %), epoxy resin (16 wt %), and potassium chloride (16 wt %), without using magnesium, the following gaseous products, in the indicated mass fractions, were obtained:

| | |
|---|---|
| K | 0.026 |
| $H_2$ | 0.017 |
| $H_2O$ | 0.100 |
| HCl | 0.002 |
| $N_2$ | 0.160 |
| CO | 0.430 |
| $CO_2$ | 0.183 |
| KCl | 0.082 |

The condensed phase is made up of solid particles of $K_2CO_3$. The weight ratio of the gaseous phase to the condensed phase is 0.6 to 0.4.

During the cooling process of the aerosol in open air, $KCl_1$, KOH, $KHCO_3$, $K_2CO_3$, and perhaps oxides of potassium, such as KO and $K_2O$, pass from the gaseous phase to the condensed phase. The solid particles thus formed have a diameter on the order of approximately one micron.

When the aerosol interacts with the combustion zone of the fire which is to be extinguished, such as a hydrocarbon fire, both homogenous and heterogeneous reactions take place. The heterogeneous inhibition processes, usually between solid and gaseous phases, take place at temperatures of up to about 1000 K. Above this temperature the predominant inhibition processes are homogeneous, typically between gaseous reactants.

The heterogenous processes may be described with the aid of the following reactions:

$$A.+S \rightarrow AS \quad (1)$$

$$AS+A. \rightarrow A_2+S \quad (2)$$

where A. is a radical active species from the fire to be extinguished, S is the surface of a solid aerosol particle, and $A_2$ is a molecular species.

From the above reactions it can be seen that the newly created AS can react with another active species to generate a stable molecular species while at the same time regenerating free aerosol particle surface which is available for further interaction with active species.

The homogenous inhibition processes taking place in the gaseous phase may be described by the following reactions:

$$K+.OH+M \rightarrow KOH+M \quad (3)$$

$$KOH+.H \rightarrow H_2O+K \quad (4)$$

$$KOH+.OH \rightarrow H_2O+KO \quad (5)$$

where .H and .OH are radical active species and M represents an energy input. An SFC according to the present invention may be prepared in any convenient fashion. Three such methods will be described for illustrative purposes only without in any way limiting the scope of the present invention.

In one process, the various components are dry mixed together. The mixture is then mechanically pressed to form pellets or tablets of desirable size and shape.

In a second process, the various components are mixed together to form a paste. The paste is poured into an appropriately sized and shaped form or mold and is dried, for example by heating, to remove any solvent and harden the SFC.

In a third process the components are mixed together to form a paste. The paste is simultaneously dried and shaken on a screen to form a dry powder. The powder is placed into tubes or shells suitably shaped and sized to facilitate the functioning of the SFC.

Various improvements of the methods and systems according to the present invention are possible. Two such improvements involve the confining of the flames of the SFC when undergoing combustion and the cooling of the combustion products prior to their release to the fire to be extinguished.

When the SFC is ignited an open flame of the burning charge is created. Also, the aerosol formed on combustion of the SFC is at elevated temperatures. The presence of an open flame, may, in specific situations, have detrimental effects. This is the case, for instance, when the fire to be extinguished involves a hydrocarbon reservoir, or where individuals are found in the vicinity and may be forced inhale flames into their lungs. Similarly, the high temperature of the aerosol militates against its uniform distribution in the volume being protected. The latter difficulty arises since a hot aerosol tends to first rise by natural convection toward the ceiling of the premises, reaching the focus of the fire to be extinguished only after the aerosol has cooled down sufficiently to descend onto the fire. Such circuitous movement of the aerosol may further lead to the escape of a portion of the aerosol from the space where it is intended to stay, with the attendant reduction in fire extinguishing efficiency and with possible adverse environmental effects on the surroundings, including personnel.

It is thus generally desirable to confine the flame produced in the combustion of the SFC while at the same time cooling the hot aerosol formed during the combustion of the SFC.

The confinement and cooling may be effected by any number of suitable methods. The approaches can be broken into physical cooling and cooling involving chemical reactions. Examples of various such techniques are described below.

One such method is to allow the SFC to combust intensely with the subsequent combination, as by ejection, of the hot aerosol with a coolant. Another method involves the dispersal of the SFC through the intensive intermixing of the air medium with the aerosol formed in simultaneous combustion of the entire rated quantity of compounded mixture, the mass of which is distributed in the volume being protected.

In the first method of cooling, it is possible to use as a coolant air, nitrogen, carbon dioxide, water, aqueous solutions of sodium salts and potassium salts, and the like. Experiments have demonstrated that the application of water or aqueous solutions of salts is preferable, since these coolants have high heat capacities and heats of vaporization.

Two basic methods of carrying out the intermixing of gases and liquids are offered, by way of illustration. The first involves the displacement of the liquid into a mixing chamber with the gas flux. A second involves the ejection of the liquid by the gas flux into a mixing chamber where the pressures and temperatures of the two fluxes become uniform. The latter method offers a number of advantages over the first. Primarily, the method does not require a reservoir operating under pressure, and is of simpler design.

Procedures for designing gas-liquid ejectors are set forth in the monograph of E. Ya. Sokolov and N. M. Zinger "Fluidic Apparatus", Moscow, Gosenergoizdat Publishers, 1984 (in Russian), which is incorporated in its entirety by reference as if fully set forth herein. The gas-liquid ejector designs disclosed in the above-referenced monograph are largely inapplicable to the cooling of an SFC aerosol. This is because the flame or high-temperature aerosol is likely to break through into the mixing chamber and even into the volume being protected immediately after the ignition of the SFC cartridge due to a delay in the supply of the coolant flux.

The present invention is of a series of novel and unique configurations which can be used to practically implement the underlying principles. Specifically, the configurations disclosed and claimed herein are intended to implement fire extinguishing or smoke creating techniques which overcome the difficulties which are encountered when a basic SFC-based system is implemented. In particular, some of the embodiments which are described below incorporate various means of cooling the aerosol so as to reduce its temperature and increase its density in order to decrease or eliminate adverse effects to surrounding personnel and property and in order to direct the aerosol to the base of the fire without waste of material or delay. The configurations further deal with ways of increasing the rate of aerosol formation so that the aerosol is made available to extinguish the fire earlier than would otherwise be possible.

The principles and operations of the various configurations according to the present invention can best be understood with reference to the drawings and accompanying discussion.

Referring now to the drawings, FIG. 1 illustrates a basic embodiment of a fire extinguishing or smoke creating system according to the present invention. Here the solid, granulated, powdered or gelled SFC 10 is packed or molded into a profile 12 of suitable size and shape and of any desired length, typically made of metal. An igniter 14 is used to activate the SFC and may be connected via an igniter cable 16 to a flame or heat detector, a suitable manual or automatic activating mechanism, and the like. Upon activation, the SFC reacts to form a wall of aerosol which is uniformly discharged through the slotted opening of profile 12. Two or more units such as those shown in FIG. 1 can be connected end-to-end to form a unit of any suitable length and can be installed in corridors or along the walls of a room or other enclosure.

To control the rate of aerosol formation, it is desirable to control the size of the SFC particles. It has been found that, over a certain size range as the SFC particles are made smaller and their surface to volume ratio increases, the rate of aerosol formation increases as does its fire extinguishing effectiveness. It was further found that when the SFC particles are made too small, the aerosol formation rate is too large, resulting in a lowered fire extinguishing effectiveness and possible explosions in closed spaces. In many fire extinguishing applications it is desirable to have all the aerosol formed within 10 or 20 seconds from the onset of aerosol formation. It has been found that suitable SFC reaction rates are those which result in the penetration of the reaction front into the SFC cartridge at the rate of from about 0.65 to about 1.35 mm/sec, with an optimum being approximately 1.1 mm/sec.

It is further important to design the SFC tablet, cartridge, and the like so that it has the proper geometry for optimal fire extinguishing or smoke creating effectiveness. Specifically, it should be noted that while the volume of SFC used controls the total amount of aerosol which is, in theory, available for extinguishing the fire, the exposed surface area of the tablet, cartridge, and the like, plays a leading role, along with particle size, in determining the rate of aerosol formation. Thus, the larger the gross surface area of the tablet, cartridge, and the like, the higher the rate of aerosol formation. For example, very high rates can be achieved where the SFC is "painted" in a thin layer onto a large surface, such as a wall, as is described below.

Figure 2:
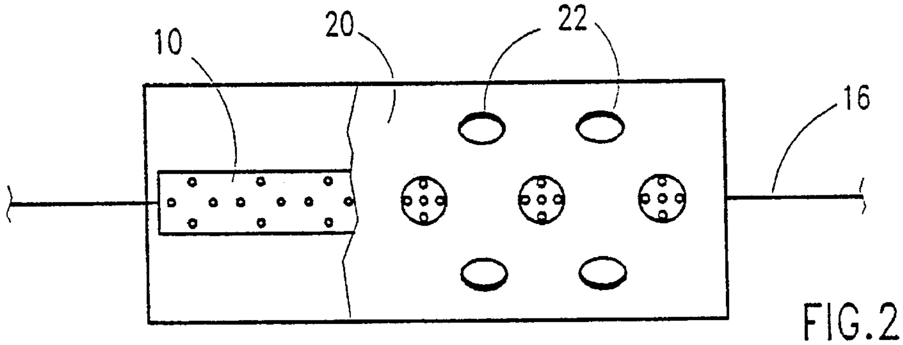
FIG. 2 is another configuration according to the present invention showing SFC material in solid or powder form placed in a perforated tube.

Another configuration is shown in FIG. 2. Here SFC, preferably cylindrical in shape, is located inside a perforated tube 20. Upon activation, the SFC reacts to form an aerosol which escapes through the perforations 22 into the space to be protected or to be filled with smoke.

Figure 3:
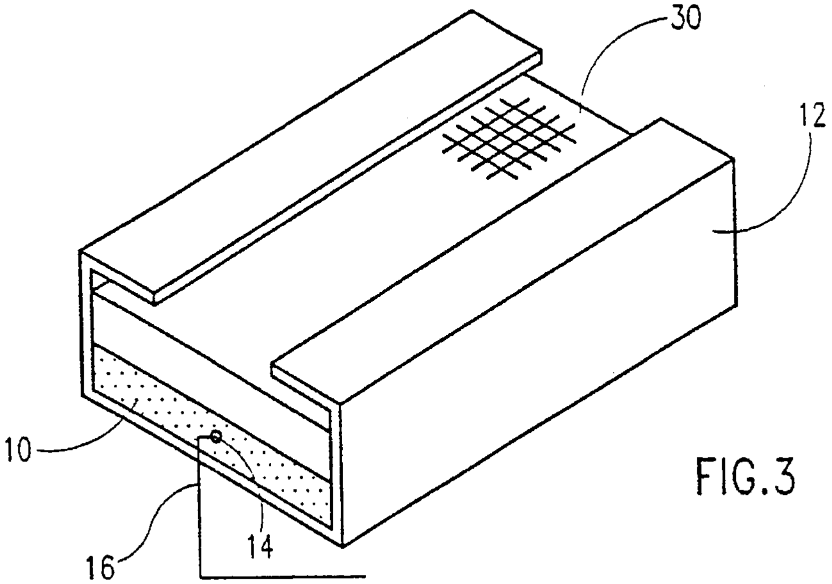
FIG. 3 is a configuration as in FIG. 1 but with a layer of cooling material placed over the SFC.
Figure 4:
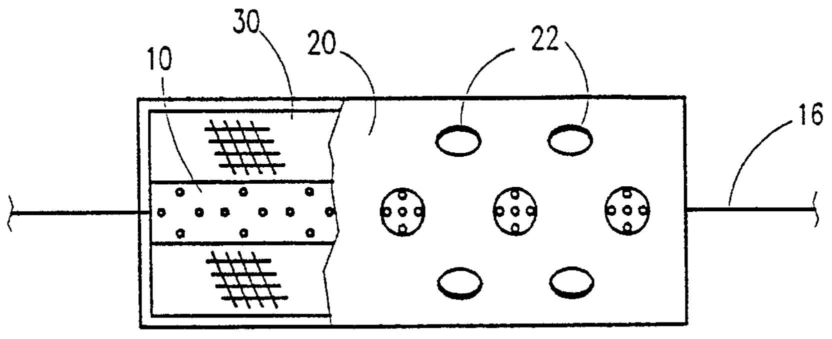
FIG. 4 is a configuration as in FIG. 2 but with a layer of cooling material placed around the SFC.

Variations of the two embodiments of FIGS. 1 and 2 are shown in FIGS. 3 and 4, respectively. Here a suitable cooling material 30 is placed over the SFC (FIG. 3) or around the SFC (FIG. 4). In these embodiments the aerosol which is formed upon activation of the SFC is forced to pass through cooling material 30 which results in the cooling of the aerosol prior to its release into the space to be protected.

Various means of cooling the aerosol are possible. One way is to effect heat exchange between the aerosol and a suitable heat absorbing medium, such as water, solutions of water and ethylene glycol or water and acetone, solid granulated dry ice ($CO_2$), and the like.

Another means of cooling the aerosol is by allowing the aerosol to chemically react with a suitable material in an endothermic, or heat-absorbing, reaction or by bringing about the creation of water molecules which have a large heat capacity and which are capable of absorbing significant amounts of heat.

Examples of suitable chemical coolants are boric acid ($H_3BO_3$) and similar acids which react with the basic intermediate potassium hydroxide (KOH), created during the ignition of the SFC, to form water. The reaction is believed to be:

$$H_3BO_3+3KOH \rightarrow K_3BO_3+3H_2O$$

Additional materials which may be suitable in this context include, but are not limited to, $NaHCO_3$, $KHCO_3$, $H_2CO_3$, and the like.

Figure 5:
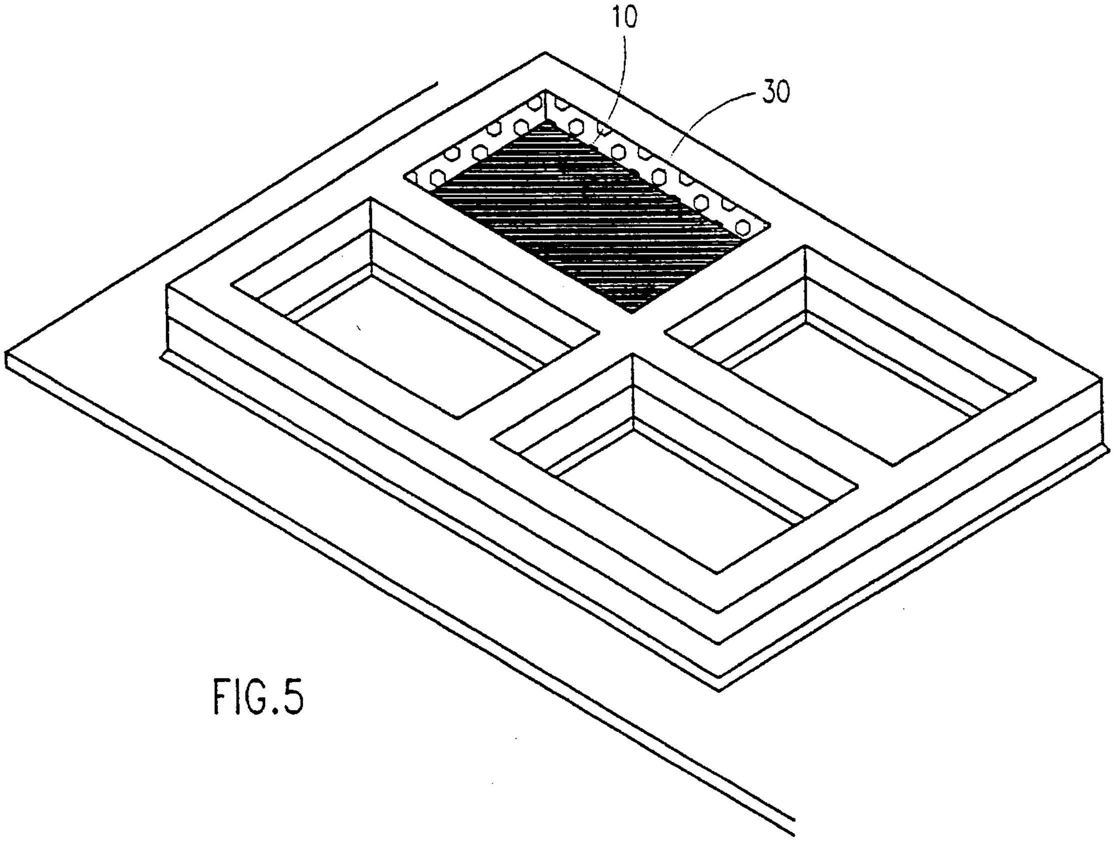
FIG. 5 is another configuration according to the present invention showing an arrangement of SFC sandwiched between layers of hydrophilic material.

Depicted in FIG. 5 is an illustrative embodiment of a honeycomb configuration wherein each of the voids of the honeycomb includes a layer of SFC 10 which is covered, preferably both at the top and at the bottom, with a layer of material 30 which will bring about the cooling of the aerosol, by physical and/or by chemical means. Any of the materials described above may be used for material 30. In addition, it may be useful to use as material 30 a granulated bed of perlite, vermiculite, or similar hydrophilic minerals which are capable of absorbing and keeping moisture for long periods of time. When the aerosol is discharged through the granulated bed the aerosol interacts with the moisture over the considerable surface area of the granulated particles and is cooled in the process.

Figure 6:
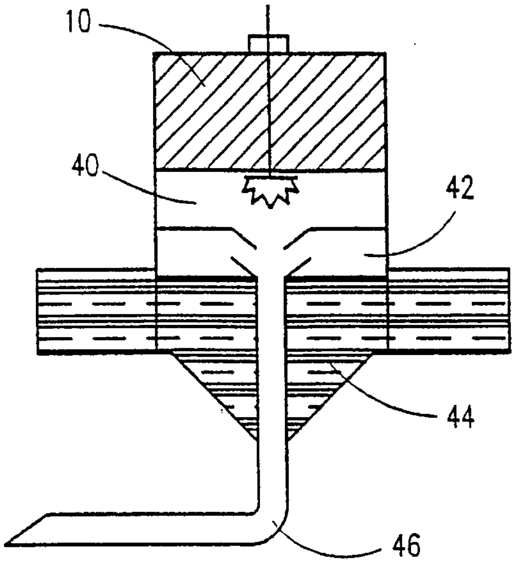
FIG. 6 is another configuration according to the present invention showing a cooling system involving passage of the aerosol through a pipe surrounded by cooling liquid.

Another configuration according to the present invention is shown in FIG. 6 wherein the SFC is reacted in a burning chamber 40 from which the aerosol passes to a displacement chamber 42 where it contacts a suitable cooling liquid 44. Aerosol leaves the system through a tuyere 46 which runs through cooling liquid 44, thereby serving to further cool the aerosol prior to its exit from the system and its entry into the space to be protected.

Figure 7:
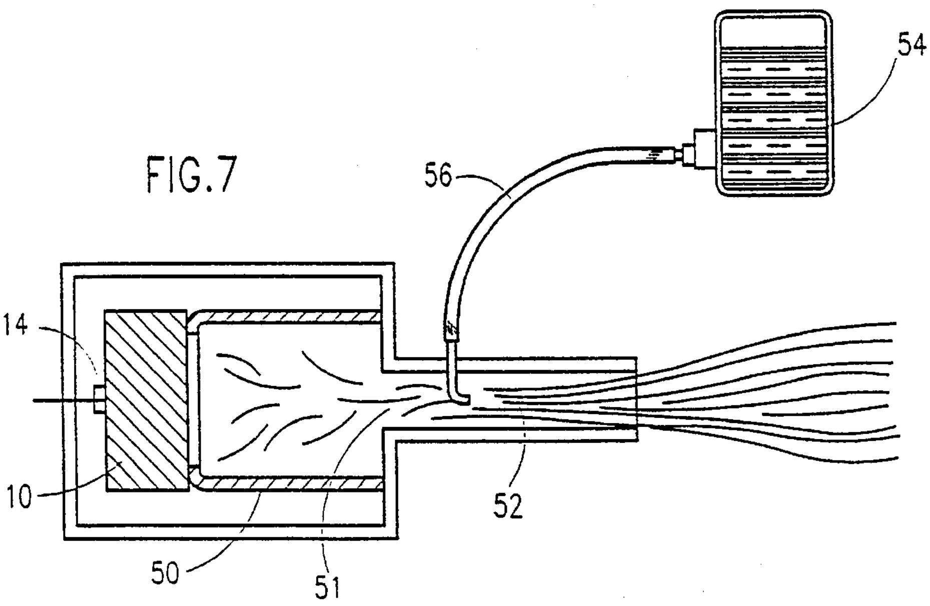
FIG. 7 is another configuration according to the present invention showing a cooling system involving the injection of coolant into the aerosol.

A related configuration is shown in FIG. 7 where aerosol formed upon the activation of SFC 10 enters a stopper 50, which serves to immobilize the SFC cartridge and prevent the blocking off of the chamber opening 51, prior to passage of the through an exhaust pipe 52 and its exit from the system. During its passage through exhaust pipe 52 the aerosol is cooled by the addition of a suitable coolant from a reservoir 54 which enters exhaust pipe 52 through a pipe 56.

Figure 8:
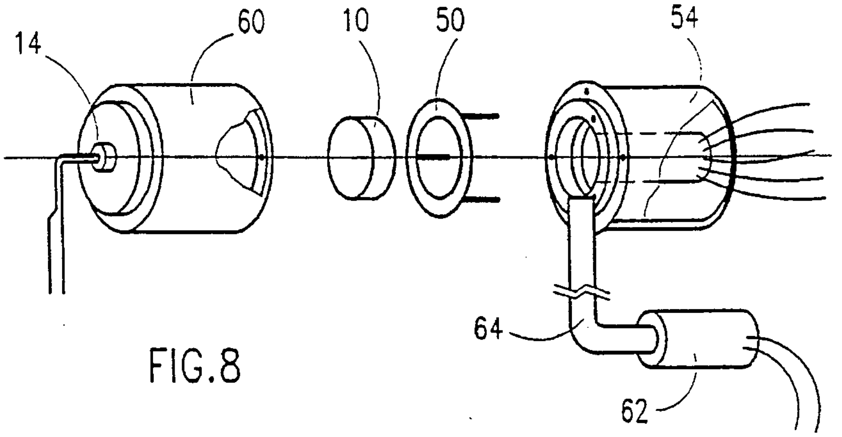
FIG. 8 is an exploded view of another configuration according to the present invention showing a compact unit including SFC and coolant injection.
Figure 9:
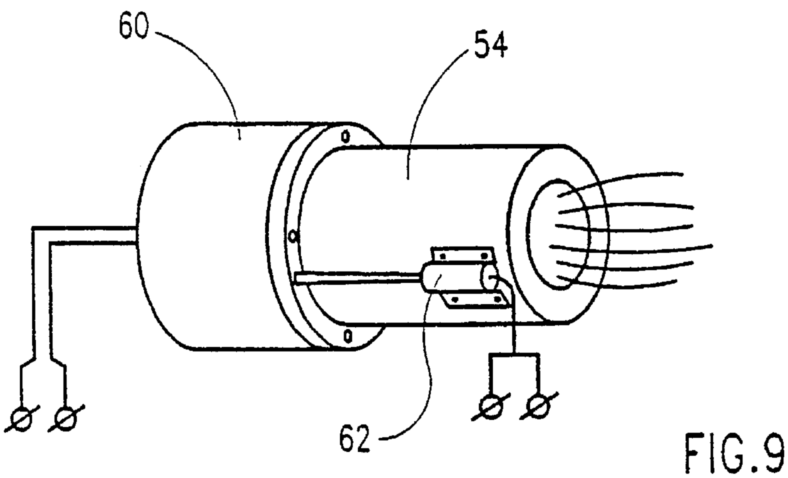
FIG. 9 is an assembled view of the configuration of FIG. 8.

A similar configuration is shown in exploded and assembled views in FIGS. 8 and 9, respectively. The compact SFC generator shown in FIGS. 8 and 9 features a combustion chamber 60 which houses SFC 10. A coolant pump 62 injects coolant through a tube 64 into the aerosol.

Figure 10:
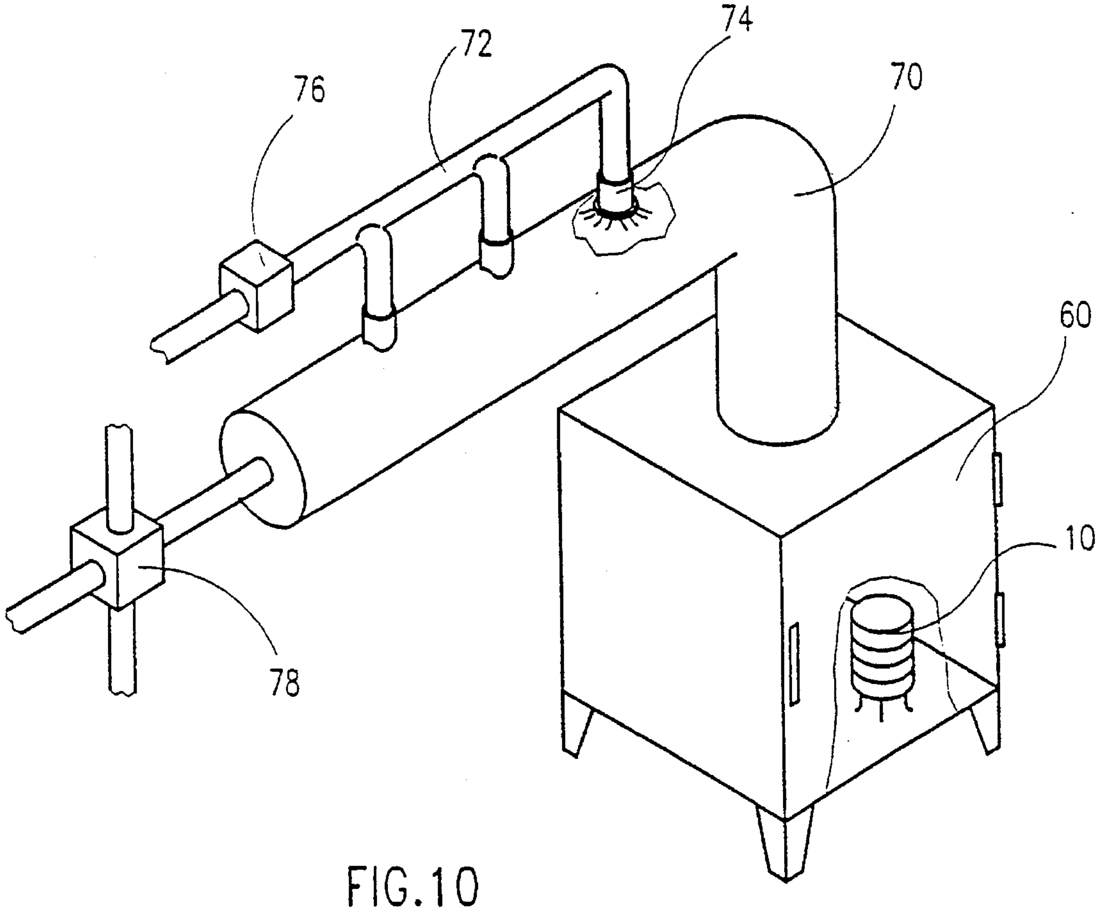
FIG. 10 is a schematic depiction of a fire extinguishing system featuring SFC material and a distribution manifold for conducting the aerosol to various locations following injection of coolant.

The various configurations discussed can be modified so as to channel the formed aerosol, after cooling if desired, through a manifold to various locations. Such a system is depicted schematically in FIG. 10. Here, combustion chamber 60 includes SFC 10. Exhaust pipe 70 leads the hot aerosol away from combustion chamber 60. Coolant pipe 72, which is preferably equipped with an appropriate nozzle 74, is used to introduce coolant into exhaust pipe 70. A valve 76 may be used to control the flow of coolant. The cooled aerosol then enters a distributor 78 from where it is distributed to two or more locations. Such an arrangement may be useful where adjoining but separate chambers are endangered by a fire in one of the chambers such that a fire in one chamber preferably triggers fire extinguishing means in several chambers. An example of such a situation is the storage compartments of a commercial aircraft.

Figure 11:
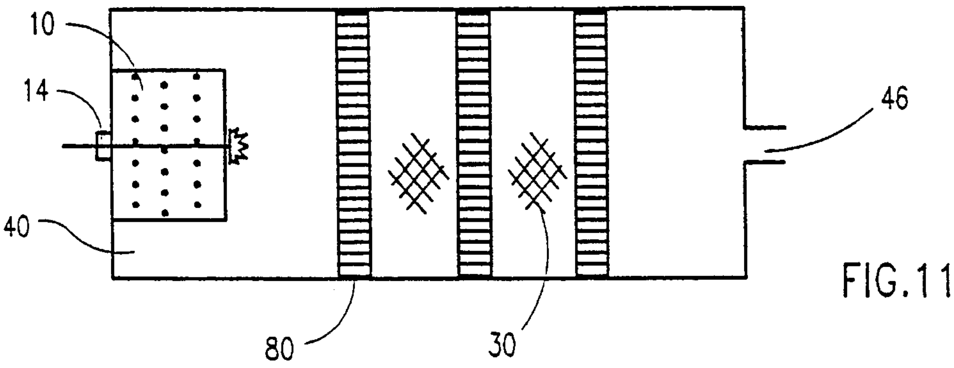
FIG. 11 is another configuration according to the present invention featuring SFC material, cooling material, and flame arrestors.

Yet another configuration according to the present invention is presented in FIG. 11 which, in contrast with the previously discussed embodiments, features flame arrestors 80, between which is preferably located suitable cooling material 30. Flame arrestors 80 serve to break up the flame, preventing the flame from reaching the outside of the unit where they could trigger undesirable combustion of the surroundings, and further serve to enhance the contact between the aerosol and the cooling material 30.

Systems according to the present invention may also be used immersed in a liquid, such as oil, which serves as the cooling medium upon activation of the SFC. Two such configurations are shown in FIGS. 12–15.

Figure 12:
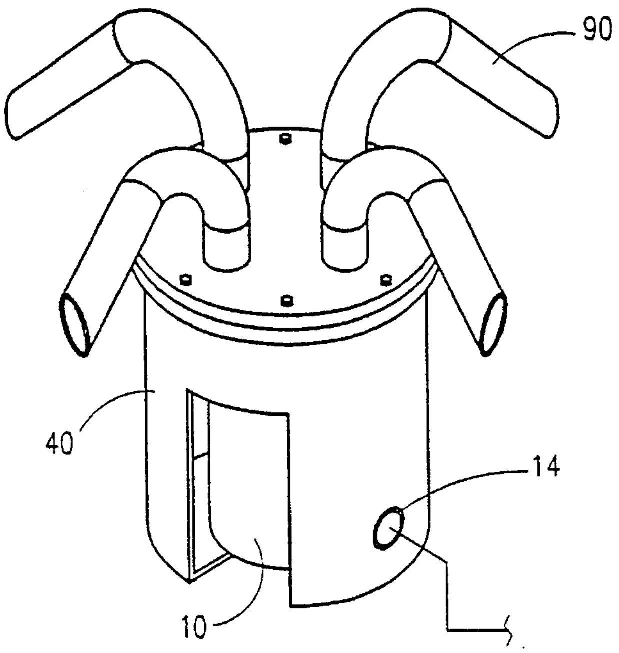
FIG. 12 is another configuration according to the present invention designed for use immersed in a liquid.
Figure 13:
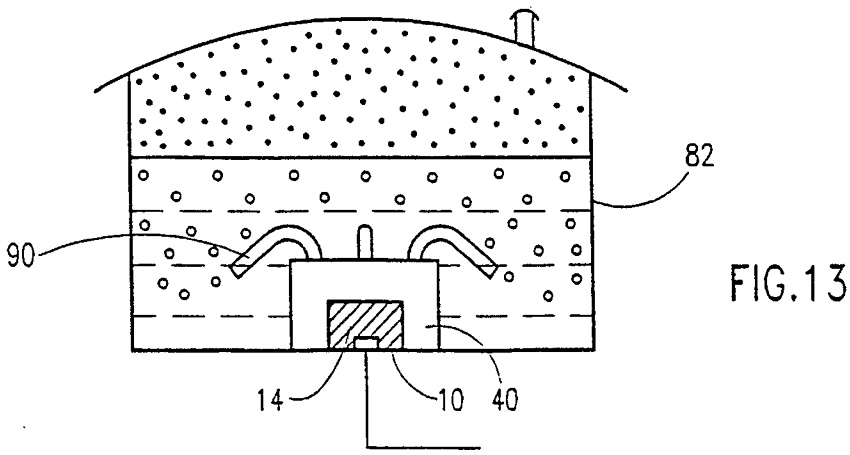
FIG. 13 shows the configuration of FIG. 12 as it would appear when deployed in a liquid tank.

The device depicted in FIG. 12 includes a combustion chamber 40 which houses SFC 10. Combustion chamber 40 is completely closed except for one or more exhaust pipes or tuyeres 90 which are so angled as to prevent the ingress of liquid into combustion chamber 40 when the device is submerged in an oil tank 82 (FIG. 13). When the SFC 10 is activated, the aerosol produced has sufficient pressure to exit the device through exhaust pipes 90 and to enter the oil reservoir where the aerosol is cooled as it rises through the oil to the vapor space at the top of oil tank 82, where the fire to be extinguished is typically located.

Figure 14:
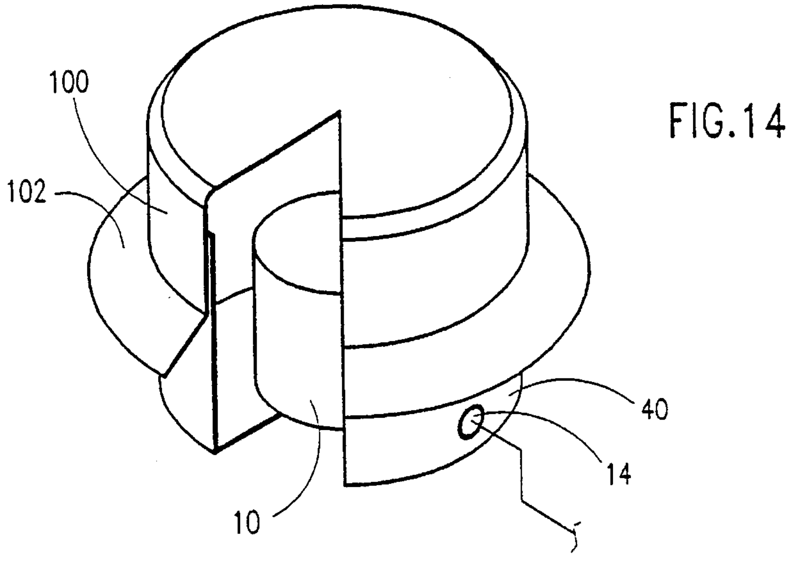
FIG. 14 is yet another configuration according to the present invention designed for use immersed in a liquid.
Figure 15:
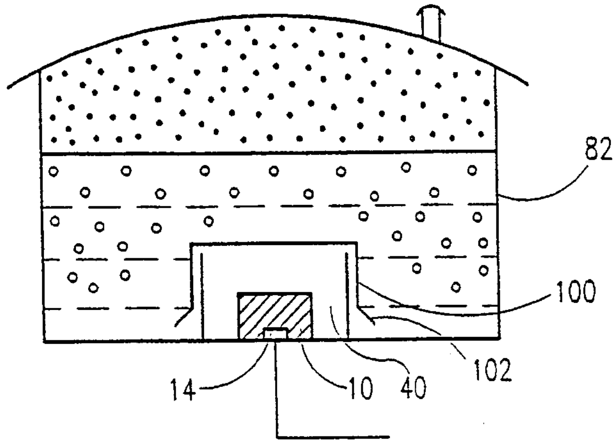
FIG. 15 shows the configuration of FIG. 14 as it would appear when deployed in a liquid tank.

A similar device, but one configured slightly differently, is shown in FIGS. 14 and 15. Here, the exhaust pipes 90 of FIGS. 12 and 13 are replaced by a cover 100 which preferably features an outwardly extending rim 102. When SFC 10 is activated, the aerosol formed leaves combustion chamber 40 through the space between combustion chamber 40 and cover 100 and is dispersed radially outwardly into the oil to a degree determined largely by the geometry of rim 102.

Figure 16:
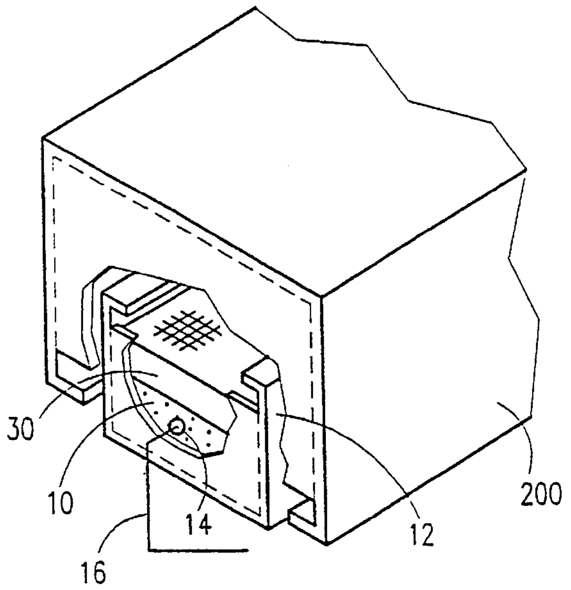
FIG. 16 is yet another configuration according to the present invention, related to that of FIG. 3, designed for use immersed in a liquid.
Figure 17:
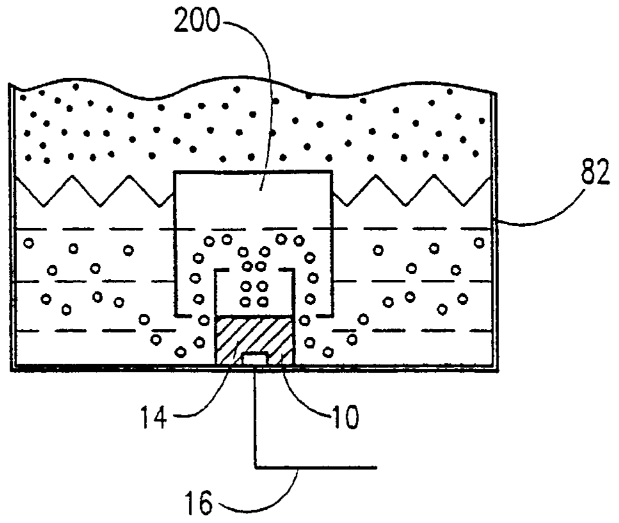
FIG. 17 shows the configuration of FIG. 16 as it would appear when deployed in a liquid tank.

Yet another similar device is shown in FIGS. 16 and 17. Here use is made of a device similar to that of FIG. 3 but further including a special cover 200, which unlike the cover of the embodiment shown in FIGS. 14 and 15, extends for relatively large distances, perhaps several meters. Cover 200 is shaped such that when SFC 10 is activated, the aerosol formed leaves as shown in FIG. 17 throughout the length of cover 200 to form a screen, or curtain, of aerosol. It has been found that suitable SFC reaction rates are those which result in the spread of the reaction front along SFC face at the rate of about 12 cm/sec.

Another configuration effective in the extinguishing of fires in a specified space involves "painting" the interior walls, or some other surface, of the space to be protected with SFC in the form of a paint-like paste or quick-drying liquid. Such a configuration may preferably incorporate the benefits of cooling the aerosol by "painting" over the SFC a layer of suitable coolant material 30.

Various additional ways of delivering aerosols formed by devices according to the present invention may be envisioned. Shown in FIG. 18 is an embodiment which carries out the cooling of the aerosol by a fan 300 which moves air and which serves to simultaneously carry the aerosol created by the SFC 302 from the device and cool the aerosol.

Figure 18:
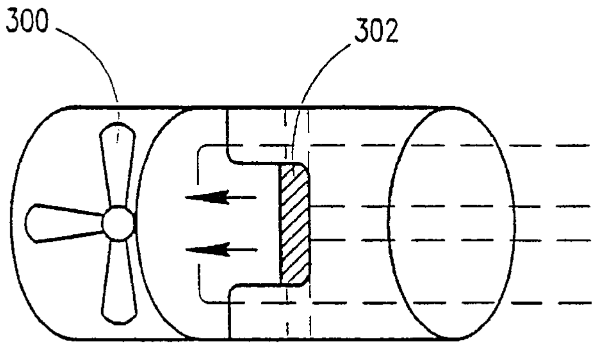
FIG. 18 depicts a system wherein a fan is used to carry and to cool the SFC aerosol.
Figure 19:
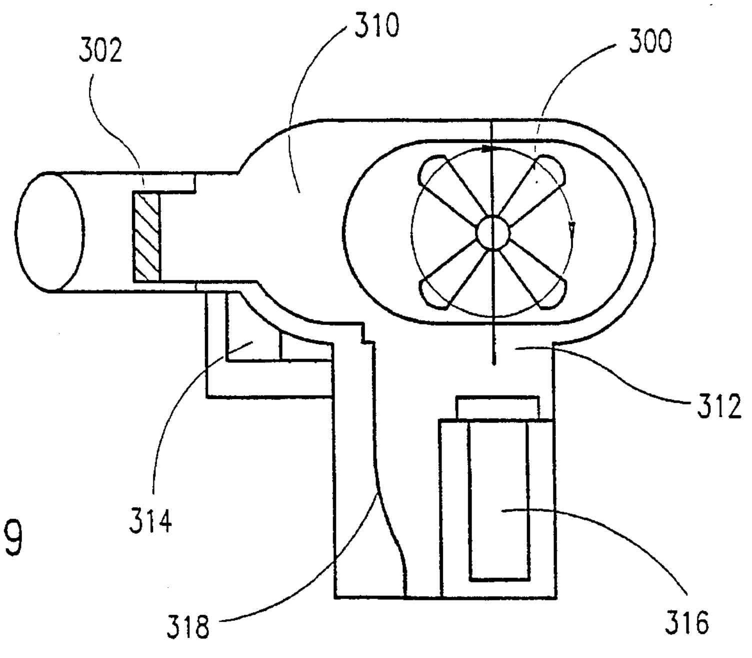
FIG. 19 depicts an embodiment as in FIG. 18 further including a handle and trigger and wherein the device is in the form of a hand gun.

Another version of the embodiment of FIG. 18 is shown in FIG. 19. Here a handgun device is used to produce the aerosol and deliver it to the desired location. The device includes a housing 310 which houses the SFC 302 and a fan 300. Housing 310 is connected to, or is integrally formed with, a handle 312 which features a trigger 314 or similar activator. Preferably, handle 312 also includes a power supply 316, such as a battery, which is used to start the reaction of SFC 302 using an initiator 318.

Figure 20:
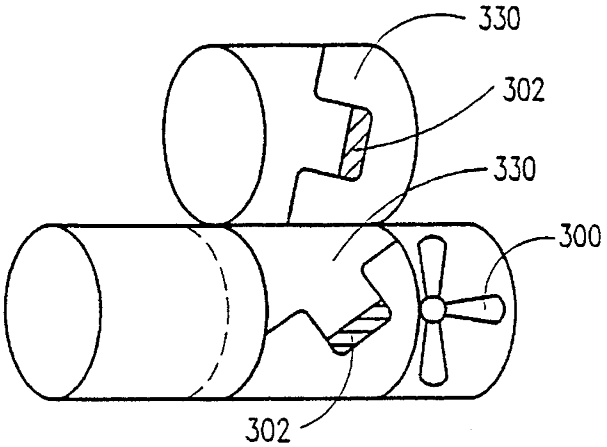
FIG. 20 shows a system as in FIGS. 18 and 19 featuring interchangeable SFC magazines.

In another embodiment according to the present invention shown in FIG. 20, a device such as those shown in FIGS. 18 or 19 is modified through the inclusion of interchangeable SFC magazines 330. The use of magazines 330 makes it possible to use the same 'gun' in repeated operations by simply replacing a spent magazine with a fresh one.

Devices according to the present invention can also be used in conjunction with more conventional fire extinguishers, such as those based on the release of pressurized $CO_2$ or $N_2$. Conventional fire extinguishers containing $CO_2$ or $N_2$ and various mixtures of inert gases are limited in their ability to effectively deliver their contents in open spaces. To overcome this difficulty, it is possible to modify such a conventional fire extinguisher by adding to it SFC capabilities, thereby increasing the fire extinguishing effectiveness of the device and reducing the concentration of conventional fire extinguishing agents required for effective fire fighting.

Nitrogen-based conventional fire extinguishers are typically based on inertization, i.e., the extinguisher operates by lowering the oxygen concentration in the vicinity of the fire, thereby denying the open flames an oxygen supply. One of the difficulties with such systems is the formation of small amounts of toxic gases, such as $(CN)_2$ and NO. To avoid the formation of such toxic gases it is preferable to use a completely inert gas such as argon which forms no toxic chemicals, although it is considerably more expensive than nitrogen.

Carbon dioxide-based fire extinguishers are in widespread use, primarily because of their relatively low cost and nontoxicity, combined with its effectiveness as a fire extinguisher and its electrical insulation properties. The big advantage of carbon dioxide over nitrogen is that the former is easier to liquefy, carbon dioxide having a vapor pressure of 850 psi at 70° F. With the aid of refrigeration, it is possible to keep carbon dioxide at 0° F. at a pressure of 300 psi. The fire extinguishing effectiveness of carbon dioxide results from a combination of two phenomena—(1) the reduction of oxygen concentration in the area of the fire by blanketing the area, and (2) the reduction of the effective oxygen concentration to below about 12% and the cooling of the fire by absorbing heat, primarily by endothermic chemical reactions. These reactions include:

$$CO_2+H_2+18252 \text{ Btu/lb mole} \rightarrow CO+H_2O$$

$$C+H_2O+56718 \text{ Btu/lb mole} \rightarrow CO+H_2$$

which, in sum, yield:

$$CO_2+C+74970 \text{ Btu/lb mole} \rightarrow 2CO$$

Thus, the overall reaction between the burning carbon and the carbon dioxide produces carbon monoxide via an endothermic reaction. Such reactions have been determined to take place during the extinguishing of a fire with carbon dioxide. Prior to the introduction of carbon dioxide, the flames are yellow, owing to the presence of the carbon and release thick black smoke because of the incomplete combustion of the carbon. When the carbon dioxide is introduced, two effects are observed in the burning zone. The color of the flame changes gradually from yellow to blue, with yellow layers. At the same time, the concentration of smoke decreases and the smoke disappears completely prior to the final extinguishment of the fire.

Carbon dioxide has been used for years as a total flooding/inerting/extinguishing agent in both portable and non-portable fire extinguishers. However, the relative inefficiency of carbon dioxide owing, in part, to its light weight and high dispersivity, requires that a large amount of gas be used to put out a given fire. By contrast, SFC according to the present invention has a significantly higher fire extinguishing efficiency, so that a smaller amount of SFC has the same fire extinguishing capability of a much larger amount of carbon dioxide. Two inherent shortcomings of SFC in large volume application were discussed above. One of these is the exothermic nature of the SFC reactions, while another is the small particle size of the aerosol particles. The heat generated, in conjunction with the heat of the fire, tends to lighten, or reduce the density of, the aerosol, thereby allowing the aerosol to rise away from the fire base rather than zeroing in on the source of the fire, thus reducing the fire extinguishing effectiveness of the aerosol. As discussed above, to overcome these difficulties, it is often desired to cool the SFC aerosol so as to facilitate its more accurate delivery to the site of the fire.

In the absence of cooling of the SFC aerosol, the aerosol may be suspended and would tend to float and rise upwards and away from the sources of the fire. The effect is magnified when the heat of the fire causes air above the fire to rise turbulently upwards, which tends to further scatter and disperse the SFC aerosol, preventing it from reaching the base of the fire and reducing its effectiveness.

In certain embodiments according to the present invention, the cooling and driving power of a conventional carbon dioxide fire extinguisher is used to cool and drive an SFC aerosol, thereby enhancing the fire extinguishing capabilities of both the carbon dioxide and of the SFC.

Figure 21:
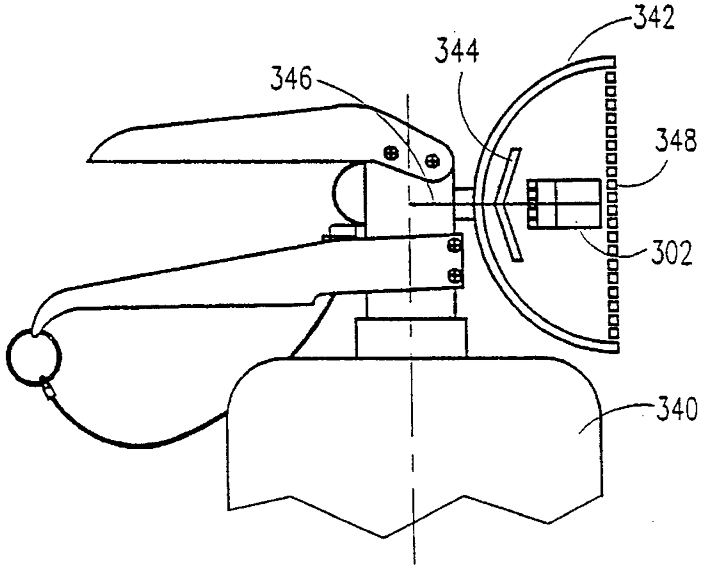
FIG. 21 illustrates an embodiment featuring a conventional fire extinguishing cylinder in combination with an SFC device.

An example of one such hybrid system is shown in FIG. 21. Here an otherwise conventional fire extinguishing cylinder 340 has been modified by the addition of SFC 302 located in the discharge diffuser 342 which also includes a reflector 344 which serves to deflect the stream of carbon dioxide so as to prevent it from directly impacting the SFC and possibly causing the termination of the reaction of the SFC components. In addition, reflector 344 serves as a convenient surface on which condensation of liquid carbon dioxide can occur. A suitable igniter 346 is used to activate SFC 302. The front face of diffuser 342 is preferably covered with a mesh screen or similar device serving as a flame arrestor 348.

In operation, the jet of gas, such as $CO_2$, released during discharge of cylinder 340 would cool the aerosol, which is designed to be released over approximately the same time interval, and facilitate its delivery to the desired location. The addition of the aerosol to the conventional fire extinguishing gases would, at the same time, significantly enhance the fire extinguishing capabilities of the conventional fire extinguisher. Preferably, the time during which the cylinder is emptied of its contents corresponds to the time required for the SFC to be exhausted. Any suitable SFC composition and any suitable ignition system may be used. Preferably, the SFC includes 40–45% $KClO_4$, 40–45% $KNO_3$, and 10–20% epoxy resin. In addition, the mixture may further contain up to about 2% Mg.

As a result of combining conventional fire extinguishing media with SFC aerosol, a novel extinguishing medium is produced which is a mixture of, for example, carbon dioxide and SFC aerosol in a pre-determined concentration, which mixture includes both the carbon dioxide and micron-sized dry chemical particles.

The precise amounts of inert gas, such as carbon dioxide, and SFC material used could be readily calculated to suit the expected conditions. For example, if one assumes that the carbon dioxide is heated from about −79° C. to about 100° C., a total of nearly 180°, then, since the heat capacity of carbon dioxide over this temperature range is, on average, 0.284 cal/gm K, the amount of heat absorbed by each gram of the carbon dioxide is:

$$Q=m\times c\times \Delta T=1\times 0.284\times 180=51 \ cal$$

A gram of SFC produces approximately 700 cal/gm. Hence, the ratio of carbon dioxide to SFC should be on the order of 15:1. For example, an extinguisher containing 1.5 kg carbon dioxide, which can be released in approximately 30 seconds, will also include approximately 100 gm of SFC.

Figure 22:
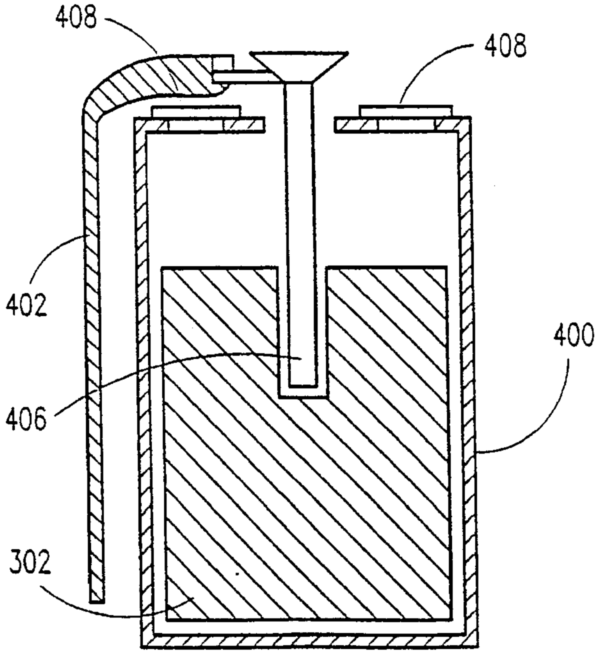
FIG. 22 shows a fire extinguishing or smoke generating device in the form of a hand-grenade.
Figure 23:
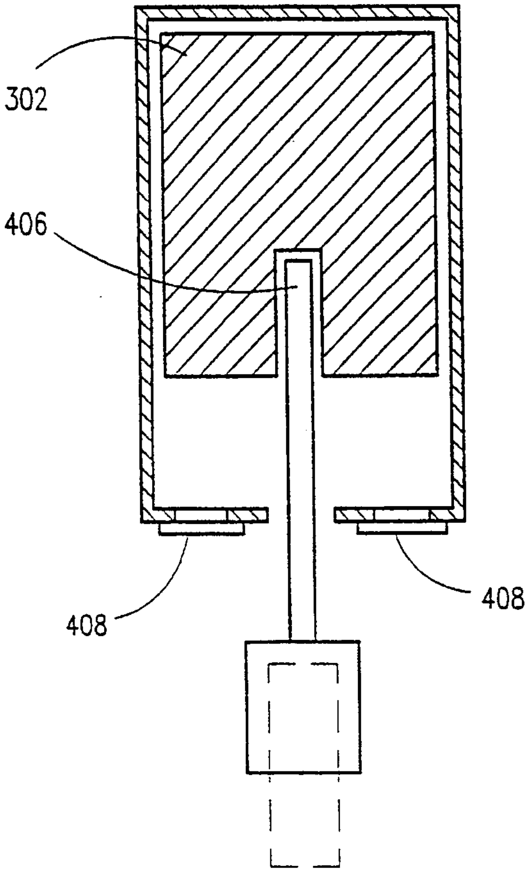
FIG. 23 shows a fire extinguishing or smoke generating device in the form of a mechanically launchable grenade.
Figure 24:
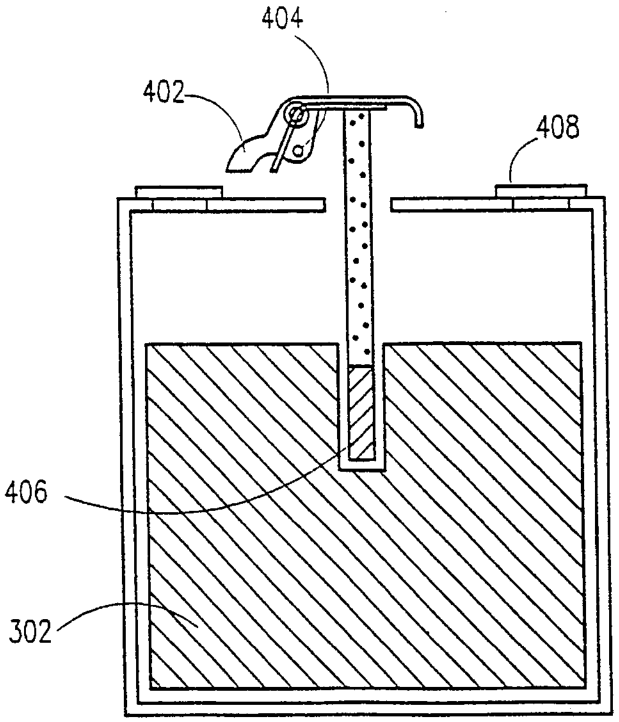
FIG. 24 shows a fire extinguishing or smoke generating device in the form of a fire extinguishing pot or a smoke pot.

Further embodiments of systems according to the present invention are depicted in FIGS. 22 to 24. These embodiments, like many of those described above, have applications both as fire extinguishing agents and as smoke screen creating agents. In both applications, it is at time desired or required to deliver the smoke or fire extinguishing material to a location which is somewhat remote from the location of the operator. For example, there is often a need to place a fire extinguishing device in a burning building to which access has been cut off or is otherwise difficult. Similarly, a smoke bomb may need to be placed near a crowd to be dispersed which may be several hundred meters away.

Shown in FIG. 22 is a grenade-like device which can be used either as a fire extinguisher or as a smoke screen generator. The device includes a housing 400 which contains SFC 302 of suitable size and shape and made by any suitable technique. The device features a handle 402 which is immobilized by a safety pin (not shown). When safety pin is removed, handle 402 can be pivoted so as to press down on an initiator 406 which serves to start the reaction of SFC 302. The aerosol formed during the reaction of SFC 302 can escape housing 400 through suitable holes 408 which, prior to use, are covered by a suitable coveting, such as adhesive tape, to prevent the contamination of the device but which are automatically removed when SFC 302 starts to produce aerosol.

A device in FIG. 22 can be thrown by hand to the desired location. Alternatively, such a device can be launched to the desired location using a mechanical launcher, such as is shown in FIG. 23. Here, the activation of initiator 406 is effected at the instant of launching through an arrangement such as that shown at the anterior end of the launcher (not shown).

Yet another embodiment of a fire extinguishing or smoke screen generating device according to the present invention is shown in FIG. 24 which depicts a fire-extinguishing pot or smoke pot. The device depicted in FIG. 24 is similar to that of FIG. 22 but is typically larger and designed to be activated in place rather than being thrown or launched for a certain distance.

An advantage of smoke generating devices according to the present invention is that the SFC products include fine particles which contribute to the formation of highly effective smoke, yet the products are completely nontoxic and environmentally friendly. Smoke generating devices according to the present invention may be used to screen visible, infrared, or microwave radiation. The activation of the devices may be electrical, mechanical, or chemical. Various SFC compositions may be used. For example, the SFC can contain alkali oxidizers such as $KClO_4$, $KClO_3$, $KNO_3$, $NaNO_3$, and $K_2CO_3$. The SFC can further contain organic reducers based on epoxy resins, and fillers of alkali salts such as KCl, and NaCl. In addition, various additives may be included, such as Mg, Al, and the like, for controlling the combustion.

The best results for producing smoke which effectively obscures the visible spectrum were obtained using the following SFC composition:

| | |
|---|---|
| $KClO_4$ | 41% |
| $KNO_3$ | 41% |
| Epoxy | 16% |
| Mg | 2% |

The selected mixture can, in addition, further include various additives to make the smoke effective in obscuring infrared and microwave radiation. When used for the obscuration of infrared radiation, metal flakes, such as Mg or Al, could be added to increase the smoke temperature and enhance the infrared obscuration. To enhance the obscuration of microwave radiation it may be desirable to add metal fibers, such as Fe, Cu, and the like.

While the invention has been described with respect to a number of preferred embodiments, it will be appreciated that many variations, modifications, and other applications of the invention may be made.

What is claimed is:

1. A method of generating nontoxic smoke comprising:

(a) submerging a nontoxic smoke creating device in a liquid coolant while preventing entry of coolant into said device; said device includes a composition which comprises:

(1) a first reactant selected from the group consisting of potassium chlorate, potassium perchlorate, potassium dichromate, cesium nitrate, and potassium nitrate; and (2) a second reactant serving as a reduction agent;

(b) activating said smoke creating device by reacting said composition comprising said first reactant and said second reactant, to create solid particulate products having a diameter of about one micron or less which create the nontoxic smoke; and (c) passing said solid particulate products into said coolant through at least one downwardly directed tuyere hydraulically connected at or near the top of said device without any accompanied destruction of said nontoxic smoke creating device.

* * * * *